United States Patent [19]
Scarff

[11] 3,968,387
[45] July 6, 1976

[54] LINEAR MAGNETIC GENERATOR
[75] Inventor: David Scarff, Agincourt, Canada
[73] Assignee: Lawrence Peska Associates, Inc., New York, N.Y. ; a part interest
[22] Filed: May 16, 1975
[21] Appl. No.: 578,214

[52] U.S. Cl. .................................. 310/16; 310/30; 322/3
[51] Int. Cl.² ........................................ H02K 35/02
[58] Field of Search ............. 290/1; 310/15, 30, 25, 310/16; 318/122, 123, 125, 128, 132, 129, 130; 322/3

[56] References Cited
UNITED STATES PATENTS

| | | |
|---|---|---|
| 2,959,747 | 11/1960 | Challacombe et al. ............ 310/15 X |
| 3,129,347 | 4/1964 | Toynola ................................. 310/15 |
| 3,252,018 | 5/1966 | Drautman ........................... 322/3 X |
| 3,454,957 | 7/1969 | Chapleuko .......................... 318/122 |
| 3,736,448 | 5/1973 | Hebel, Jr. et al. ................. 310/30 X |
| 3,754,154 | 8/1973 | Massie .............................. 310/17 X |

Primary Examiner—Donovan F. Duggan

[57] ABSTRACT

An axially movable magnetic member is disposed in coaxial relationship to pulse core windings. Responsive to alternating current or pulsed direct current applied to the pulse core windings to the movable permanent magnet is displaced axially to generate an electromagnetic force in a generating coil.

4 Claims, 5 Drawing Figures

LINEAR MAGNETIC GENERATOR

BACKGROUND OF THE INVENTION

The invention relates to power generating apparatus and particularly to power generating apparatus which is urged axially in a reciprocating manner to generate an electromagnetic force. The prior art includes a variety of apparatus such as linear induction motors. Such apparatus while having a general similarity to the present invention does not show or suggest the apparatus in accordance with the present invention.

It is an object of the invention to provide apparatus which is simple and inexpensive to manufacture and to maintain and operate.

It is still another object of the invention to provide apparatus which will be reliable in operation.

SUMMARY OF THE INVENTION

It has now been found that these and other objects of the invention may be satisfied by apparatus in which coaxially disposed generating windings and core windings are provided. The pulse core windings are disposed in end abutting relationship to the generating coil. A permanent magnet is carried for reciprocal axial travel within the generating coil. Permanent magnets are positioned in a stationary manner proximate to the pulse core windings and pulses are applied to the pulse core windings to urge the permanent magnet axially in alternating directions. The movement of the permanent magnet within the generating coil generates an electromagnetic force.

BRIEF DESCRIPTION OF THE DRAWING

The invention will be better understood by reference to the accompanying drawing in which.

DESCRIPTION OF A PREFERRED EMBODIMENT

Figure 1:
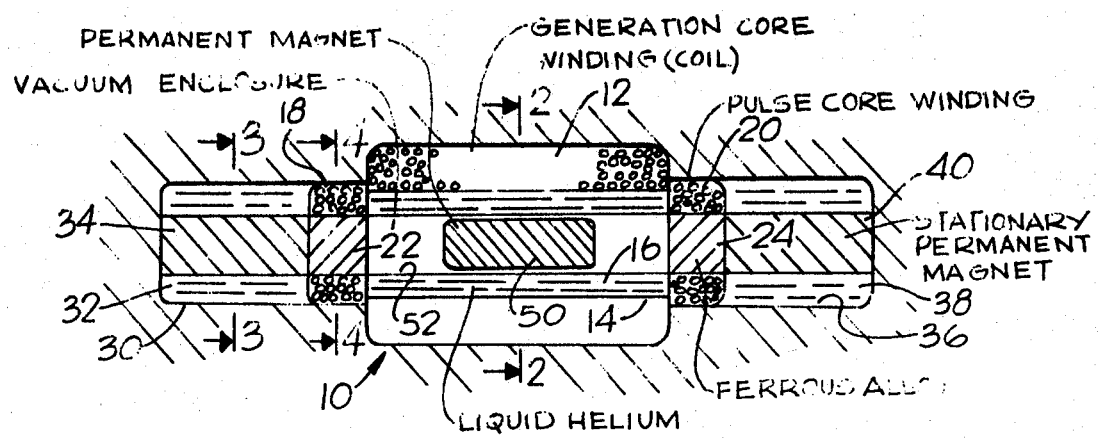
FIG. 1 is an axial sectional view of the apparatus in accordance with the invention.
Figure 2:
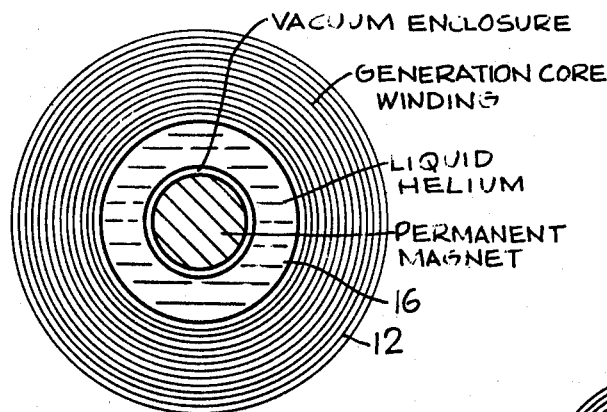
FIG. 2 is a sectional view taken through the line 2—2 of FIG. 1.
Figure 3:
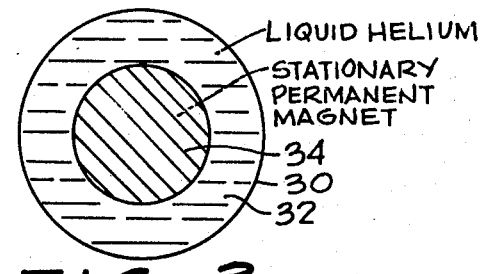
FIG. 3 is a sectional view taken through the line 3—3 of FIG. 1.
Figure 4:
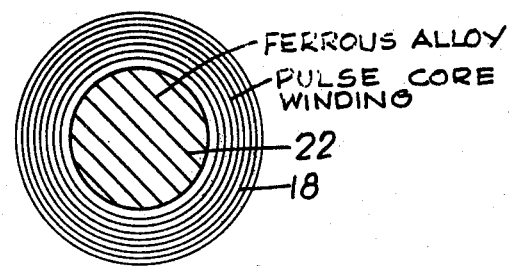
FIG. 4 is a sectional view taken through the line 4—4 of FIG. 1.
Figure 5:
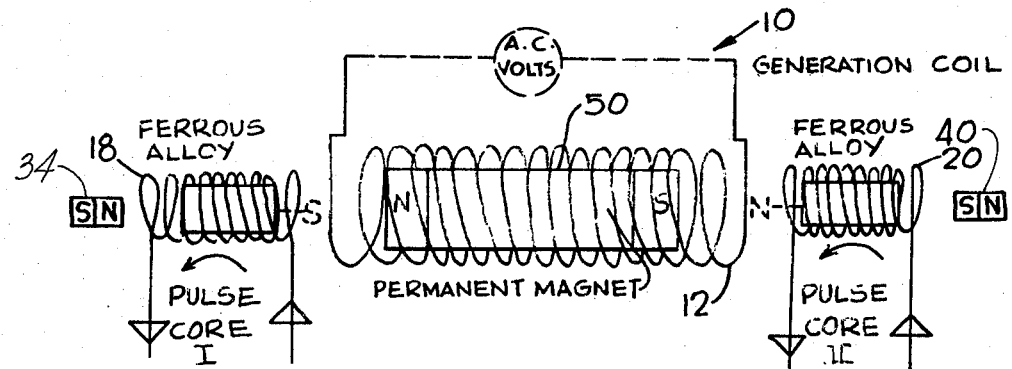
FIG. 5 is a schematic view of the apparatus in accordance with the invention.

Referring now to FIGS. 1 through 5 there is shown a novel apparatus in accordance with the invention. The apparatus 10 includes a generating winding 12 which is generally cylindrical and which has coaxially disposed therewith a cylindrical housing 14 which contains liquid helium. Disposed in axial abutting relationship to the housing 14 and the generating coil 12 at each axial extremity is a pulse core winding. A first pulse core winding disposed on the left axial extremity is designated by the numeral 18 and a second pulse core winding disposed at other axial extremity of the generating coil 12 is designated by the numeral 20. Disposed within the pulse core windings 18, 20 are respectively identical disks 22, 24 of ferrous alloy which are dimensioned for close fitting engagement with the pulse core winding with which they are associate. Disposed in axially adjacent relationship to the first pulse core winding 18 is a housing 30 which contains liquid helium 32 and which surrounds a cylindrical stationary permanent magnet indicated by the numeral 34. In a similar manner in axially adjacent relationship to the second pulse core winding 20 is a housing 36 which contains liquid helium 38 and which surrounds a cylindrical stationary permanent magnet indicated by the numeral 40.

A permanent magnet 50 is disposed in a housing 52 in coaxial relationship to the housing 14. Normally the housing 52 will be manufactured of a material which allows the passage of flux lines and which will contain a vacuum. The permanent magnet 50 is free to move axially within the housing 52 and it is to decrease resistance to the axial movement of the magnet 50 that the vacuum is established. Elimination of air from the housing 52 of course minimalizes air resistance to the magnet which must necessarily move at a relatively high rate.

It will be understood that the various chambers containing liquid helium will be provided with means (not shown) which will supply a continuing flow of liquid helium to maintain at a low temperature the permanent magnets with which they associate. The low temperature is of course desirable to increase the flux density and specifically obtain the maximum flux density for a given size of magnet. In addition the liquid helium also will aid in maintaining a cool operating temperature for the apparatus.

It will be understood that variable excitation may be provided depending on the power requirements. More specifically, in the event there is a requirement for an output of alternating current, an external alternating current may be applied to the pulse core windings 18 and 20. In the event there is requirement for an output of DC, an external DC current may be applied in pulses to the pulse core winding 18 and 20. Normally the excitation will be supplied from a battery in order to start the generator which after starting generates an alternating current. A percentage of that alternating current may be rectified for recharging of another battery and continuing pulsing. The remainder of the output current may be used for an external load.

During initial operation the first pulse core winding 18 will have a DC pulse applied until the core 22 is saturated. The direction of winding of the coil 18 and the direction of current flow in that coil results in a north pole at the axial extremity thereof which is most closely disposed to the permanent magnet 50. This attracts the permanent magnet 50 to the core 22 and generates EMF or electromagnet force in the generating coil 12.

Thereafter, with the cessation of the DC pulse the permanent magnet 50 is repelled. In a similar manner the DC pulse is passed through the pulse core winding 20 and the intermittant application thereto results in alternate attraction and repulsion of the movable permanent magnet 50 with respect to the stationary permanent magnet 40 and disk 24. The pulses applied to pulse core windings 18 and 20 are continued at predetermined rates corresponding to the frequency of the alternating current which it is desired to produce. It will be understood that the movement of the permanent magnet through the winding coil 12 results in the generation of an EMF in the coil 12 since the lines of flux are present around the movable magnet 50 and the cutting therethrough generates an EMF which may be used for many applications.

It will be seen that the apparatus as described provides a system which utilizes magnetic forces to generate an alternating current with the input of a relatively small alternating current or pulse direct current in the pulse cores.

Having thus described my invention, I claim:

1. A generator which includes a generating coil having a generally cylindrical form and which includes an axial bore therethrough, said generating coil having a pulse core winding in coaxial relationship disposed at each axial extremity thereof, a permanent magnet carried for axial movement within said generating coil, and permanent stationary magnets carried proximate to each pulse core windings.

2. The apparatus as described in claim 1 wherein each of said elements is in coaxial relationship.

3. The apparatus as described in claim 2 wherein said apparatus includes liquid helium cooling.

4. The apparatus as described in claim 1 wherein said movable permanent magnet disposed within said generating coil is disposed within a housing which is evacuated to minimize air resistance to the axial travel of said movable permanent magnet.

* * * * *